US012192738B2

(12) United States Patent
Baijal et al.

(10) Patent No.: US 12,192,738 B2
(45) Date of Patent: Jan. 7, 2025

(54) ELECTRONIC APPARATUS FOR AUDIO SIGNAL PROCESSING AND OPERATING METHOD THEREOF

(71) Applicant: SAMSUNG ELECTRONICS CO., LTD., Suwon-si (KR)

(72) Inventors: Anant Baijal, Suwon-si (KR); Cheulhee Hahm, Suwon-si (KR); Jayoon Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 194 days.

(21) Appl. No.: 17/727,202

(22) Filed: Apr. 22, 2022

(65) Prior Publication Data

US 2022/0345844 A1 Oct. 27, 2022

Related U.S. Application Data

(63) Continuation of application No. PCT/KR2022/003297, filed on Mar. 8, 2022.

(30) Foreign Application Priority Data

Apr. 23, 2021 (KR) ........................ 10-2021-0053100

(51) Int. Cl.
*H04S 7/00* (2006.01)
*G06T 7/70* (2017.01)
(Continued)

(52) U.S. Cl.
CPC ................ *H04S 7/303* (2013.01); *G06T 7/70* (2017.01); *G06V 20/41* (2022.01); *G10L 25/57* (2013.01);
(Continued)

(58) Field of Classification Search
None
See application file for complete search history.

(56) References Cited

U.S. PATENT DOCUMENTS 6,829,018 B2   12/2004   Lin et al.
8,879,761 B2   11/2014   Johnson et al.
(Continued)

FOREIGN PATENT DOCUMENTS

JP           2017-530619 A    10/2017
KR    10-2015-0088874 A     8/2015
(Continued)

OTHER PUBLICATIONS

Samsung, "Feel like you're transported into a concert hall", Jan. 6, 2020, Samsung, 4 pages total, www.samsung.com/levant/tvs/qled-tv/sound/.
(Continued)

*Primary Examiner* — Kenny H Truong
(74) *Attorney, Agent, or Firm* — Sughrue Mion, PLLC

(57) ABSTRACT

A method of an electronic apparatus for audio signal processing includes obtaining a parameter related to spatialization of an audio object, obtaining rendering information based on the parameter related to spatialization, and rendering the audio object based on the rendering information. The parameter related to spatialization includes at least one of an object parameter of a feature of at least one of the audio object or a video object associated with the audio object, an electronic apparatus parameter of a feature of the electronic apparatus, or a user parameter of a feature of a user.

20 Claims, 12 Drawing Sheets

(51) Int. Cl.
*G06V 20/40* (2022.01)
*G10L 25/57* (2013.01)

(52) U.S. Cl.
CPC ............ *G06T 2207/10016* (2013.01); *G06T 2207/30196* (2013.01); *G06T 2207/30242* (2013.01); *H04S 2400/11* (2013.01); *H04S 2420/01* (2013.01)

(56) References Cited

U.S. PATENT DOCUMENTS

| | | | |
|---|---|---|---|
| 9,154,877 | B2 | 10/2015 | Kim et al. |
| 9,338,420 | B2 | 5/2016 | Xiang |
| 9,596,555 | B2 | 3/2017 | Kaburlasos et al. |
| 10,200,804 | B2 | 2/2019 | Chen et al. |
| 10,303,427 | B2 | 5/2019 | Shintani et al. |
| 10,791,410 | B2 | 9/2020 | Eronen et al. |
| 10,863,301 | B2 | 12/2020 | Schmidt et al. |
| 10,904,692 | B2 | 1/2021 | Robinson et al. |
| 11,032,646 | B2 | 6/2021 | Walther et al. |
| 2017/0289724 | A1 | 10/2017 | Breebaart et al. |
| 2018/0054689 | A1 | 2/2018 | Chen et al. |
| 2018/0314486 | A1 | 11/2018 | Edry et al. |
| 2020/0059724 | A1* | 2/2020 | Walther .................. H04S 7/303 |
| 2020/0288256 | A1* | 9/2020 | Jung ....................... G06V 20/46 |
| 2021/0035597 | A1* | 2/2021 | Eubank .................. H04S 7/304 |

FOREIGN PATENT DOCUMENTS

| | | |
|---|---|---|
| KR | 10-2020-0003159 A | 1/2020 |
| KR | 10-2020-0058593 A | 5/2020 |
| KR | 10-2020-0071099 A | 6/2020 |

OTHER PUBLICATIONS

Samsung, "Moving Sound+ (OTS+)", Jan. 6, 2020, Samsung, 4 pages total, https://www.samsung.com/sec/glossary/tvs/object-tracking-sound-plus/.

Samsung, "Samsung Electronics Unveils 2020 QLED 8K TV at CES", Jan. 6, 2020, Samsung, 6 pages total, from https://news.samsung.com/global/samsung-electronics-unveils-2020-qled-8k-tv-at-ces.

Sony, "360 Reality Audio", Copyright 2021, Sony, 31 pages total, https://www.sony.com/electronics/sound-quality.

Communication dated Jun. 7, 2022 issued by the International Searching Authority in counterpart Application No. PCT/KR2022/003297 (PCT/ISA/220, PCT/ISA/210, and PCT/ISA/237).

* cited by examiner

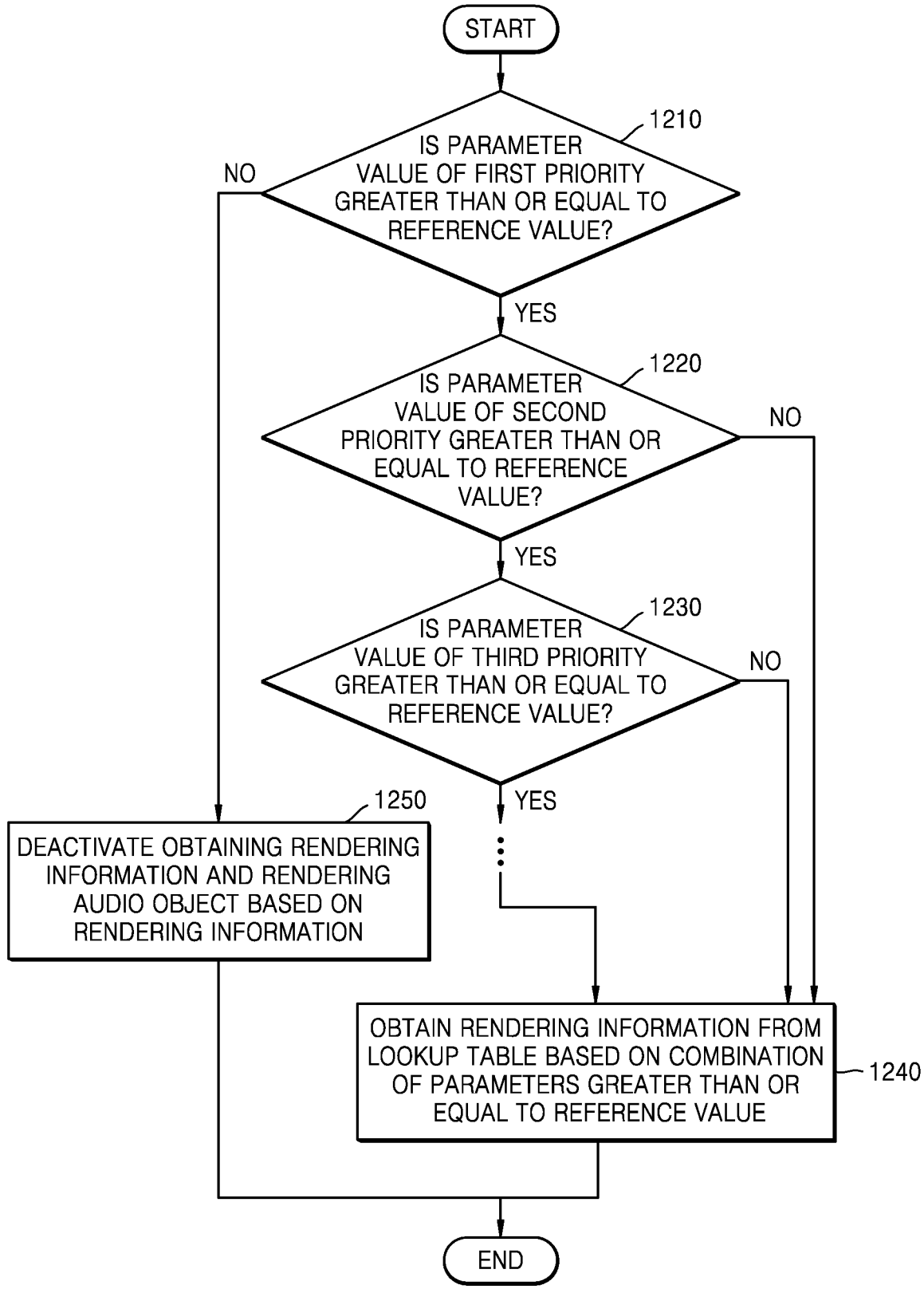

ELECTRONIC APPARATUS FOR AUDIO SIGNAL PROCESSING AND OPERATING METHOD THEREOF

CROSS-REFERENCE TO RELATED APPLICATIONS

This application is a by-pass continuation of International Application No. PCT/KR2022/003297, filed on Mar. 8, 2022 in the Korean Intellectual Property Receiving Office, which based on and claims priority to Korea Patent Application No. 10-2021-0053100, filed on Apr. 23, 2021 in the Korean Intellectual Property Office, the disclosures of which are incorporated by reference herein in their entireties.

BACKGROUND

Field

The disclosure relates generally to an electronic apparatus for audio signal processing and an operating method thereof, and more particularly, to an electronic apparatus for rendering an audio signal output together with a video signal, and an operating method thereof.

Description of Related Art

A technology for playing an audio signal stereoscopically is being developed. For this purpose, an encoder side may generate a parameter for playing an audio signal three-dimensionally and transmit the parameter together with the audio signal to a decoder side. The decoder side may output the audio signal stereoscopically by processing the audio signal by using the parameter received from the encoder side.

However, there is a problem in that the encoder side may not pre-perform such a preliminary operation on a broadcast signal or an audio signal streamed in real time. Thus, it is required to develop a technology for realistically outputting an audio signal output together with a video signal, even without separately receiving a parameter from an encoder.

SUMMARY

Provided are an electronic apparatus for audio signal processing, which obtains parameters related to spatialization of an audio object and obtains rendering information by using the parameters, and an operating method thereof.

Provided are an electronic apparatus for audio signal processing, which renders an audio object as three-dimensional sound based on rendering information, and an operating method thereof.

Additional aspects will be set forth in part in the description which follows and, in part, will be apparent from the description, or may be learned by practice of the presented embodiments.

According to an aspect of the disclosure, a method of an electronic apparatus for audio signal processing may include obtaining a parameter related to spatialization of an audio object, obtaining rendering information based on the parameter related to spatialization, and rendering the audio object based on the rendering information. The parameter related to spatialization may include at least one of an object parameter of a feature of at least one of the audio object or a video object associated with the audio object, an electronic apparatus parameter of a feature of the electronic apparatus, or a user parameter of a feature of a user.

The obtaining of the rendering information may include obtaining a lookup table, and retrieving the rendering information from the obtained lookup table.

The method may include, based on the rendering information not being included in the lookup table, estimating the rendering information based on the lookup table using at least one of a statistical model, a machine learning model, or a regression model.

The parameter related to spatialization includes a plurality of parameters, each parameter having a priority, and the obtaining the rendering information may include based on a parameter value with Nth priority, where N includes a natural number, being greater than or equal to a reference value, sequentially considering a parameter value with (N+1)th priority as a next priority, and obtaining the rendering information from the lookup table based on a first combination of parameters greater than or equal to the reference value.

The obtaining of the rendering information may include obtaining the rendering information from the lookup table based on a second combination of parameters with up to (N−1)th priority as a previous priority based on the parameter value with the Nth priority being less than the reference value, and the method may further include deactivating the obtaining of the rendering information and the rendering of the audio object based on N being 1.

The obtaining of the lookup table may include changing at least one parameter value and audio rendering information related to the spatialization of the audio object in response to an output of a video signal and an audio signal from the electronic apparatus, obtaining a first assessment score from a plurality of assessors, obtaining second assessment score from the plurality of assessors with respect to a combination of a plurality of parameters, obtaining a first parameter value and rendering information corresponding to the first parameter value based on a highest average assessor score being obtained, and generating and storing the lookup table including the first parameter value and the rendering information corresponding to the first parameter value.

The object parameter may include an audio object type, and the audio object type may include at least one of information indicating whether the audio object is a voice or information indicating whether the audio object is a background sound.

The object parameter may include at least one of a video object type or information indicating a position of the video object on a screen, and the video object type may include at least one of information indicating whether the video object is a human face or information indicating whether the video object is a foreground or a background.

The electronic apparatus parameter may include at least one of unique information or setting information of the electronic apparatus, the unique information may include at least one of a sound feature, a screen size, or speaker layout information depending on a model of the electronic apparatus, and the setting information may include at least one of an audio volume of the electronic apparatus, a direction of a screen, or an operation mode of the electronic apparatus.

According to an aspect of the disclosure, an electronic apparatus for audio signal processing may include a memory storing instructions, and a processor configured to execute the instructions to obtain a parameter related to spatialization of an audio object, obtain rendering information based on the parameter related to spatialization, and render the audio object based on the rendering information. The parameter related to spatialization may include at least one of an object parameter of a feature of at least one of the audio object or a video object associated with the audio object, an electronic apparatus parameter of a feature of the electronic apparatus, or a user parameter of a feature of a user.

The processor may be further configured to execute the instructions to obtain a lookup table, and retrieve the rendering information from the obtained lookup table.

The processor may be further configured to execute the instructions to, based on the rendering information not being included in the lookup table, estimate the rendering information based on the lookup table using at least one of a statistical model, a machine learning model, or a regression model.

The parameter related to spatialization includes a plurality of parameters, each parameter having a priority, and the processor may be further configured to execute the instructions to, based a parameter value with Nth priority, where N comprises a natural number, being greater than or equal to a reference value, sequentially consider a parameter value with (N+1)th priority as a next priority, and obtain the rendering information from the lookup table based on a first combination of parameters greater than or equal to the reference value.

The processor may be further configured to execute the instructions to obtain the rendering information from the lookup table based on a second combination of parameters with up to (N−1)th priority as a previous priority based on the parameter value with the Nth priority being less than the reference value, and deactivate the obtaining of the rendering information and the rendering of the audio object based on N being 1.

The lookup table may include a value for each of types of parameters and rendering information corresponding to the value for each of the types, and the processor may be further configured to execute the instructions to obtain the lookup table by changing at least one parameter value and audio rendering information related to spatialization of an audio object in response to a video signal and an audio signal output from the electronic apparatus, obtaining a first assessment score from a plurality of assessors, obtaining second assessment score from the plurality of assessors with respect to a combination of a plurality of parameters, obtaining a first parameter value and rendering information corresponding to the first parameter value based on a highest average assessor score being obtained, and generating and storing the lookup table including the first parameter value and the rendering information corresponding to the first parameter value.

The object parameter may include an audio object type. The audio object type may include at least one of information indicating whether the audio object is a voice or information indicating whether the audio object is a background sound.

The lookup table may include a value for each of types of parameters and rendering information corresponding to the value for each of the types, and the video object type may include at least one of information indicating whether the video object is a human face or information indicating whether the video object is a foreground or a background.

The electronic apparatus parameter may include at least one of unique information or setting information of the electronic apparatus, the unique information may include at least one of a sound feature, a screen size, or speaker layout information depending on a model of the electronic apparatus, and the setting information may include at least one of an audio volume of the electronic apparatus, a direction of a screen, or an operation mode of the electronic apparatus.

According to an aspect of the disclosure, a non-transitory computer-readable recording medium may store instructions that, when executed by at least one processor, cause the at least one processor to obtain a parameter related to spatialization of an audio object, obtain rendering information based on the parameter related to spatialization, and render the audio object based on the rendering information. The parameter related to spatialization may include at least one of an object parameter of a feature of at least one of the audio object or a video object associated with the audio object, an electronic apparatus parameter of a feature of the electronic apparatus, or a user parameter of a feature of a user.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a flowchart illustrating a process of sequentially considering parameters in the order of the parameter having a higher priority, according to an embodiment.

DETAILED DESCRIPTION

Figure 1:
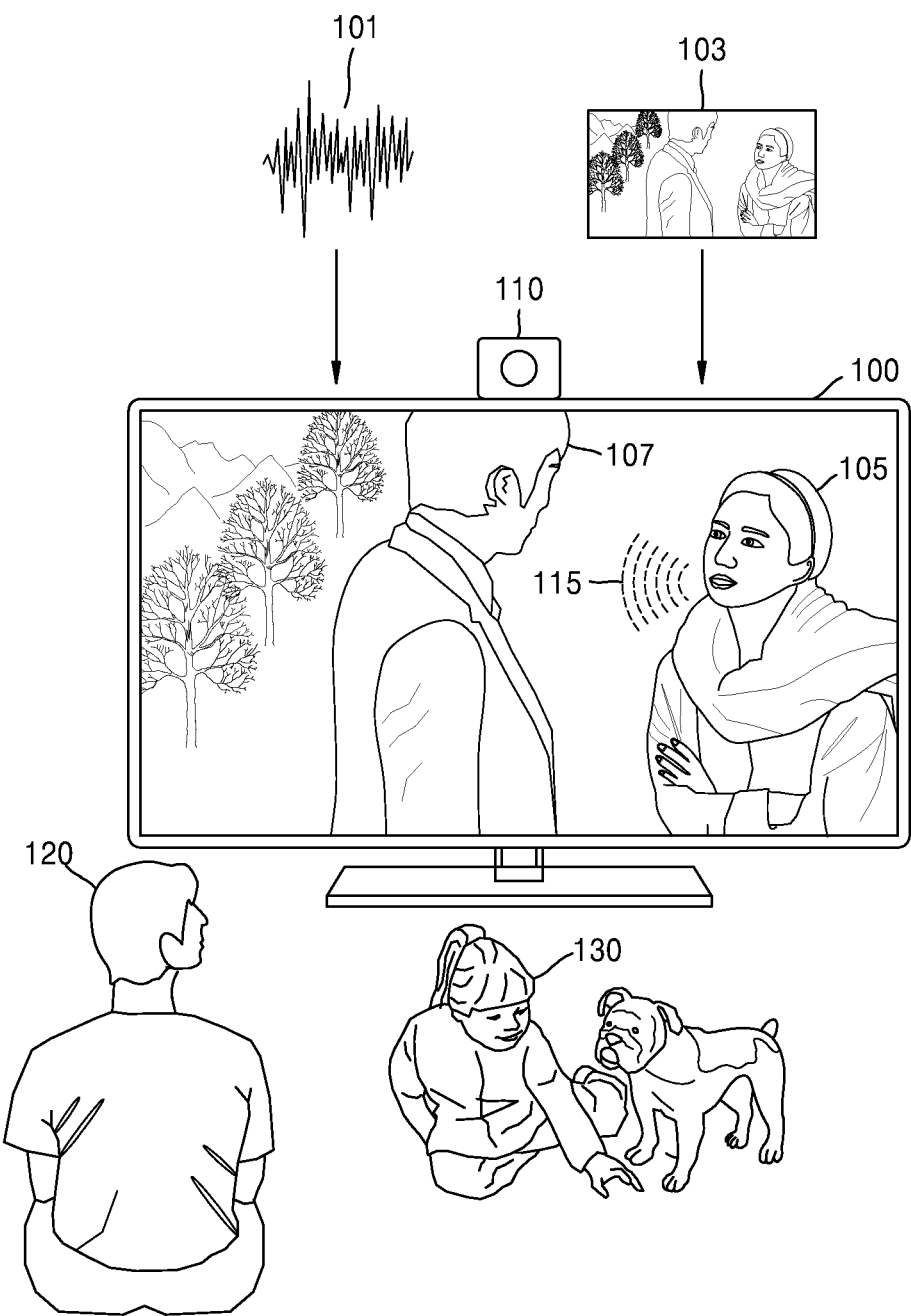
FIG. 1 is a diagram of an electronic apparatus playing an audio signal stereoscopically, according to an embodiment.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings so that those of ordinary skill in the art may easily implement the embodiments of the disclosure. However, the disclosure may be embodied in many different forms and should not be construed as being limited to the embodiments set forth herein.

The terms used herein are those general terms currently used in the art in consideration of functions in the disclosure, but the terms may vary according to the intentions of those of ordinary skill in the art, precedents, or new technology in the art. Thus, the terms used herein should be understood not as simple names but based on the meanings of the terms and the overall description of the disclosure.

Also, the terms used herein are only used to describe particular embodiments and are not intended to limit the disclosure.

Throughout the specification, when an element is referred to as being "connected" to another element, it may be "directly connected" to the other element or may be "electrically connected" to the other element with one or more intervening elements therebetween.

As used herein particularly in the claims, "the" or the like may refer to both the singular and the plural. Also, when there is no description explicitly specifying the order of operations described in a method according to the disclosure, the described operations may be performed in a suitable order. The scope of the disclosure is not limited to the described operation order.

Phrases such as "in some embodiments" or "in an embodiment" appearing in various places in the specification do not necessarily all refer to the same embodiment.

Some embodiments of the disclosure may be represented by functional blocks and various processing operations. Some or all of these functional blocks may be implemented by any number of hardware and/or software components that execute particular functions. For example, the functional blocks of the disclosure may be implemented by one or more microprocessors or may be implemented by circuit components for a certain function. Also, for example, the functional blocks of the disclosure may be implemented in various programming or scripting languages. The functional blocks may be implemented as an algorithm executed in one or more processors. Also, the disclosure may employ the related art for electronic environment setting, signal processing, and/or data processing. Terms such as "mechanism," "element," "unit," and "component" may be widely used and are not limited to mechanical and physical components.

Also, the connection lines or connection members between the elements illustrated in the drawings are merely examples of functional connections and/or physical or logical connections. In an actual apparatus, the connections between elements may be represented by various functional connections, physical connections, or logical connections that are replaceable or added.

Also, as used herein, the terms such as "units" and "modules" may refer to units that perform at least one function or operation, and the units may be implemented as hardware or software or a combination of hardware and software.

As used herein, the term "user" may refer to a person controlling the function or operation of an electronic apparatus by using an electronic apparatus and may include an assessor, a viewer, a consumer, a manager, or an installer.

Hereinafter, the disclosure will be described in detail with reference to the accompanying drawings.

FIG. 1 is a diagram of an electronic apparatus playing an audio signal stereoscopically, according to an embodiment.

Referring to FIG. 1, an electronic apparatus 100 may be an electronic device capable of processing and outputting a video signal 103 and an audio signal 101. The electronic apparatus 100 may be a fixed type or a mobile type and may be a digital television (TV) capable of receiving digital broadcasting but is not limited thereto.

The electronic apparatus 100 may be implemented as various types of electronic apparatuses including a display and a speaker. The electronic apparatus 100 may include at least one of a desktop computer, a smartphone, a tablet personal computer (PC), an e-book reader, a laptop PC, a netbook computer, a home network system, a security system, or a medical device.

The electronic apparatus 100 may be implemented not only as a flat display apparatus but also as a curved display apparatus having a screen with curvature or a flexible display apparatus having adjustable curvature. The output resolution of the electronic apparatus 100 may include, for example, High Definition (HD), Full HD, Ultra HD, or resolution higher than Ultra HD.

The electronic apparatus 100 may receive content and process and output the content. The content may include the video signal 103 and the audio signal 101. The content may include items such as TV programs provided by content providers or various movies or dramas through video on-demand (VOD) services. The content providers may refer to terrestrial broadcasting stations, cable broadcasting stations, over-the-top (OTT) service providers, or internet protocol TV (IPTV) service providers that provide various types of content to consumers.

In an embodiment of the disclosure, the electronic apparatus 100 may include an audio signal renderer. The audio signal renderer may process an input audio signal such that the audio signal may be stereoscopically output. The audio signal renderer may be manufactured in the form of at least one hardware chip or in the form of an electronic device and included in the electronic apparatus 100. Alternatively, the audio signal renderer may be implemented as a software module in the electronic apparatus 100.

In an embodiment of the disclosure, the electronic apparatus 100 may obtain a parameter related to spatialization of an audio object, obtain rendering information based on the parameter, and render the audio object by using the rendering information.

In an embodiment of the disclosure, the electronic apparatus 100 may obtain a parameter related to spatialization of an audio object.

The spatialization of the audio object may mean that the audio object is output as three-dimensional stereoscopic sound such that the sound may be realistically heard. The spatialization of the audio object may mean adding spatial information to sound by considering the pitch, tone, direction, or sense of distance of sound such that a listener who is not located in a space where a sound source is generated may perceive a sense of direction, a sense of distance, and a sense of space.

The parameter related to the spatialization of the audio object may refer to parameters that may affect the spatialization of the audio object. In an embodiment of the disclosure, the parameter related to the spatialization of the audio object may include at least one of an object parameter, an electronic apparatus parameter of the feature of an electronic apparatus, or a user parameter of the feature of a user.

The object parameter may refer to a parameter of the feature of at least one of the audio object or a video object associated with the audio object.

The electronic apparatus parameter may be a parameter representing an electronic apparatus feature affecting the spatialization of the audio object and may include at least one of unique information or setting information of the electronic apparatus. The unique information of the electronic apparatus may include at least one of a sound feature, a screen size, or speaker layout information depending on the model of the electronic apparatus. The setting information of the electronic apparatus may include at least one of the audio volume of the electronic apparatus, the direction of the screen, or the operation mode of the electronic apparatus.

The user parameter may be a parameter representing a user feature affecting the spatialization of the audio object and may include information about at least one of the number of users listening to the electronic apparatus or the position of the user.

In an embodiment of the disclosure, the electronic apparatus 100 may obtain rendering information based on the parameter related to the spatialization of the audio object.

In an embodiment of the disclosure, the electronic apparatus 100 may obtain various parameters that may affect the spatialization of the audio object and obtain rendering information corresponding to the parameter by using a combination of various parameters.

The rendering information may be information for giving a stereoscopic effect such that the audio object corresponding to the video object may be output in the direction and position recognized by the user with respect to the video object displayed on the screen. The rendering information may include at least one of a head-related transfer function (HRTF) filter coefficient or a panning coefficient. The HRTF filter may refer to a filter for localizing a virtual sound image. The HRTF filter coefficient may include at least one of an altitude filter coefficient for generating a signal with a sense of altitude in a vertical direction or a horizontal filter coefficient for spatializing a signal on a horizontal plane. The panning coefficient may be for adjusting the panning degree of a signal and may include at least one of a panning gain or a panning angle.

In an embodiment of the disclosure, the electronic apparatus 100 may render the audio object by using the obtained rendering information. As described above, the electronic apparatus 100 may spatialize the audio signal 101 by rendering the input audio signal 101 by using the obtained rendering information.

In an embodiment of the disclosure, the electronic apparatus 100 may output a rendered audio object 115 by using a speaker included in the electronic apparatus 100 or connected to the outside of the electronic apparatus 100. The electronic apparatus 100 may output the rendered audio object by using various types of speakers. For example, the electronic apparatus 100 may output audio by using various multi-channel systems such as a stereo speaker including a 2-channel output, a 5.1-channel system, a 7.1-channel system, an Auro 3D system, a Holman 10.2-channel system, an ETRI/Samsung 10.2-channel system, and a NHK 22.2-channel system.

An example of rendering an audio object by using rendering information obtained based on a parameter related to spatialization of an audio object will be described with reference to FIG. 1.

Referring to FIG. 1, the electronic apparatus 100 may obtain video objects 105 and 107 from a video signal. The electronic apparatus 100 may obtain an audio object 115 from an audio signal 101. The electronic apparatus 100 may identify that a video object 105 associated with the audio object 115 is located on the right side of the screen, the video object 105 is a human face, and an audio object output from the video object 105 is a human voice, or the like.

Also, the electronic apparatus 100 may further include a sensor 110 for obtaining a user parameter. By using the sensor 110, the electronic apparatus 100 may identify that a user 120 is located on the left side of the screen and may obtain the same as a user parameter. The electronic apparatus 100 may identify another user 130; however, because the other user 130 does not look at the electronic apparatus 100, a user parameter may not be considered separately for the other user 130.

In an embodiment of the disclosure, the electronic apparatus 100 may obtain rendering information based on the obtained parameter. The electronic apparatus 100 may render the audio object 115 by using the obtained rendering information such that the user 120 located on the left side of the screen may more clearly hear the audio object 115, that is, a human voice.

More particularly, by using the rendering information, by considering the position of the user 120 and the speaker, the electronic apparatus 100 may adjust the amplitude of a signal output from the speaker located close to the user 120 and the amplitude of a signal output from the speaker located far from the user 120. Also, the electronic apparatus 100 may allow the user 120 to more clearly hear the rendered audio object 115 by adjusting the panning angle of the audio object according to the current position of the user 120. Also, the electronic apparatus 100 may adjust the HRTF filter coefficient to localize the position at which the rendered audio object 115 is output to a virtual position such that the voice of the rendered audio object 115 may seem to be heard at the virtual position, for example, the current position of the video object 105 on the screen.

As such, according to an embodiment of the disclosure, the electronic apparatus 100 may provide a more accurate, clear and stereoscopic audio signal to the user by rendering the audio object by using various parameters affecting audio spatialization.

Figure 2:
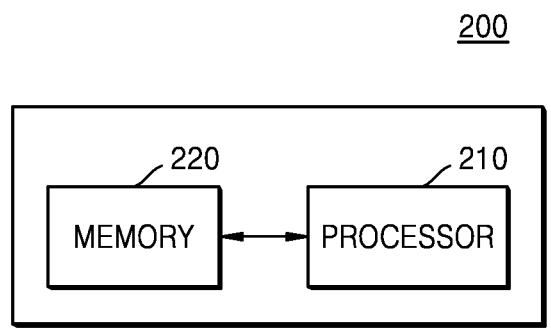
FIG. 2 is a diagram of an electronic apparatus according to an embodiment.

FIG. 2 is a diagram of an electronic apparatus according to an embodiment.

Referring to FIG. 2, an electronic apparatus 200 may include a memory 220 and a processor 210.

The electronic apparatus 200 of FIG. 2 may be an example of the electronic apparatus 100 of FIG. 1.

The memory 220 according to an embodiment of the disclosure may store at least one instruction. The memory 220 may store at least one program executed by the processor 210.

In an embodiment of the disclosure, the memory 220 may store data input to or output from the electronic apparatus 200.

The memory 220 may include at least one type of storage medium among flash memory type, hard disk type, multimedia card micro type, card type memory (e.g., SD or XD memory), random access memory (RAM), static random access memory (SRAM), read only memory (ROM), electronically erasable programmable read only memory (EEPROM), programmable read only memory (PROM), magnetic memory, magnetic disk, and optical disk.

In an embodiment of the disclosure, rendering information to be applied to an audio object may be prestored in the memory 220. The rendering information may be stored, for example, in the form of a lookup table but is not limited thereto. The lookup table may include rendering information mapped to a parameter value related to spatialization of an audio object. The lookup table may include rendering information corresponding to each parameter value with respect to each parameter. Alternatively, the lookup table may include rendering information corresponding to a combination of a plurality of parameters. The rendering information may include at least one of an HRTF filter coefficient or a panning coefficient, and the panning coefficient may include at least one of a panning gain or a panning angle.

When a parameter value has a certain value, a manufacturer may obtain a rendering value most suitable for spatialization of an audio object through experiment, generate optimal rendering information corresponding to the parameter value as a lookup table, and store the same in the memory 220. Alternatively, the manufacturer may generate a lookup table and store the same on a server managed by the manufacturer. The electronic apparatus 200 may download and obtain a lookup table suitable for the electronic apparatus 200 from a server or the like managed by the manufacturer.

Also, in an embodiment of the disclosure, an electronic apparatus parameter may be stored in the memory 220. The electronic apparatus parameter may be a parameter representing the feature of the electronic apparatus 200 itself related to spatialization of an audio object.

The manufacturer may pre-obtain an electronic apparatus parameter of the electronic apparatus 200 and prestore the same in the memory 220 of the electronic apparatus 200.

The electronic apparatus parameter may include electronic apparatus unique information and electronic apparatus setting information.

In an embodiment of the disclosure, the processor 210 may control an overall operation of the electronic apparatus 200. The processor 210 may control the electronic apparatus 200 to function by executing one or more instructions stored in the memory 220.

In an embodiment of the disclosure, the processor 210 may obtain a parameter related to spatialization of an audio object by executing one or more instructions stored in the memory 220. In an embodiment of the disclosure, the processor 210 may obtain at least one of an object parameter, an electronic apparatus parameter, or a user parameter as a parameter related to spatialization of an audio object.

In an embodiment of the disclosure, the processor 210 may obtain an object parameter from an input video signal and an input audio signal. The object parameter may include an audio object type, and the audio object type may include at least one of information about whether the audio object is a voice or information about whether the audio object is a background sound. In an embodiment of the disclosure, the object parameter may include at least one of a video object type or information about the position of the video object on the screen, and the video object type may include at least one of information about whether the video object is a human face or information about whether the video object is a foreground or a background.

In an embodiment of the disclosure, the processor 210 may obtain an electronic apparatus parameter from the memory 220. The processor 210 may obtain at least one of unique information or setting information of the electronic apparatus. In an embodiment of the disclosure, the unique information may include at least one of a sound feature, a screen size, or speaker layout information depending on the unique model of the electronic apparatus 200, and the setting information may include at least one of the audio volume of the electronic apparatus 200, the direction of the screen, or the operation mode of the electronic apparatus 200.

In an embodiment of the disclosure, the processor 210 may obtain a user parameter. The user parameter may include information about at least one of the number of users around the electronic apparatus 200 or the position of the user. By using a sensor such as a camera, the processor 210 may identify at which position the user is located with respect to the electronic apparatus 200. The processor 210 may obtain the number of users, the position of the user, the range of a sweet spot, information about whether the user is currently located in at the sweet spot, and/or the like as a user parameter.

In an embodiment of the disclosure, the processor 210 may obtain a lookup table. The processor 210 may obtain a lookup table prestored in the memory 220 of the electronic apparatus 200 or may download and obtain a lookup table from an external server.

In an embodiment of the disclosure, the processor 210 may obtain rendering information corresponding to the corresponding parameter from the lookup table based on the obtained lookup table and the obtained parameter. In an embodiment of the disclosure, the processor 210 may spatialize the audio object by rendering the audio object by using the obtained rendering information.

In an embodiment of the disclosure, the lookup table stored in the memory 220 may not include all of the rendering information corresponding to the parameter. This may be because, when the manufacturer generates a lookup table, it is difficult to individually perform an experiment on all parameter values or to perform an experiment by considering all combinations of a plurality of parameters. Also, in terms of the capacity of the memory 220, it may be inefficient to store rendering information corresponding to all parameter values in the memory 220. Thus, the manufacturer may obtain rendering information corresponding to a parameter value through experiment with respect to only a random parameter value, a frequently-used parameter value, or the like, not with respect to all parameter values, and generate the same as a lookup table. For example, when rendering information is obtained with respect to an audio volume of the electronic apparatus among the electronic apparatus parameters, when the audio volume is 5, 10, or 15, the manufacturer may generate a lookup table by obtaining only rendering information corresponding thereto.

In an embodiment of the disclosure, when rendering information corresponding to a parameter value is not included in the lookup table, the processor 210 may estimate and obtain the rendering information corresponding to the parameter value based on rendering information corresponding to another parameter value included in the lookup table. For example, when the audio volume currently set by the user is 7, the processor 210 may obtain rendering information in the case of an audio volume of 5 and rendering information in the case of an audio volume of 10 from the lookup table and predict rendering information in the case of an audio volume of 7 based on the obtained rendering information.

In an embodiment of the disclosure, by using a statistical model, the processor 210 may analyze a distribution of rendering information corresponding to a parameter value and obtain rendering information corresponding to a parameter value not stored in the lookup table, therefrom.

Alternatively, by using a machine learning model, the processor 210 may predict rendering information corresponding to a parameter value not stored in the lookup table. By using a machine learning model, the processor 210 may analyze and learn the data stored in the lookup table, consider the weight between the rendering value and the parameter value included in the lookup table, and predict rendering information corresponding to a new parameter value based on the same.

Alternatively, the processor 210 may use a regression model. By using a regression model, the processor 210 may obtain an average by considering parameter values as a condition affecting the rendering information and calculate rendering information corresponding to a new parameter value based on the same.

As such, by using at least one of a statistical model, a machine learning model, or a regression model, the processor 210 may estimate rendering information corresponding to a parameter value not stored in the lookup table.

The processor 210 may obtain rendering information from the lookup table based on a combination of parameters greater than or equal to a reference value. The reference value may be a threshold value for indicating whether the parameter value satisfies a certain condition and may be a value set by the user with respect to each parameter or automatically set by the electronic apparatus 200. Alternatively, the reference value may be prestored in the lookup table with respect to each parameter.

In an embodiment of the disclosure, priority may be set between a plurality of parameters.

For example, a plurality of parameters may be assigned priority in the order of a screen size, an audio volume, a video object type, a video object position, a user position, and/or the like.

In an embodiment of the disclosure, the processor 210 may obtain rendering information corresponding to parameters in the order of the parameter having a higher priority.

In an embodiment of the disclosure, based on a combination of parameters with high priority, the processor 210 may obtain rendering information corresponding to combined parameters.

In an embodiment of the disclosure, when the parameter value with the Nth priority (N is a natural number) is greater than or equal to the reference value, the processor 210 may sequentially consider the parameter value with the (N+1)th priority as the next priority and obtain rendering information from the lookup table based on a combination of parameters greater than or equal to the reference value.

In an embodiment of the disclosure, the processor 210 may determine whether the parameter value with high priority is greater than or equal to the reference value. In the above example, the processor 210 may first determine whether the screen size is greater than or equal to a certain size, for example, 40 inches, and consider the audio volume as the parameter with the next priority when the screen size is greater than or equal to the certain size. When the audio volume is set to a reference value or more, for example, 3 or more, the processor 210 may consider the video object type with the next priority. Similarly, when the video object type is a human face or a foreground object, the processor 210 may consider the video object position with the next priority. The processor 210 may obtain rendering information by considering a plurality of parameters satisfying the reference value sequentially in the order of the parameter having a higher priority.

In an embodiment of the disclosure, when the parameter value with the Nth priority is not greater than or equal to the reference value, the processor 210 may obtain rendering information from the lookup table based on a combination of parameters with the up to (N−1)th priority as the previous priority. That is, in an embodiment of the disclosure, when the parameter value with high priority is not greater than or equal to the reference value, the processor 210 may no longer consider the parameter value of the next priority. For example, in the above example, when the audio volume is set to a value less than the reference value, for example, 1, the processor 210 may not consider the video object type with the next priority. In this case, the processor 210 may retrieve rendering information corresponding to the parameter value of the speaker size and the audio volume from the lookup table by considering only the speaker size and the audio volume having high priority.

In an embodiment of the disclosure, when the parameter value with the highest priority does not satisfy the reference value, the processor 210 may deactivate a function of obtaining rendering information and a function of rendering an audio object by using the rendering information.

In an embodiment of the disclosure, the priority between parameters may be set by the manufacturer or may be set or changed by the user of the electronic apparatus 200. The user may adjust the priority between parameters according to personal taste or the like. Also, the user may select only particular parameters from among a plurality of parameters to be used to obtain rendering information.

Figure 3:
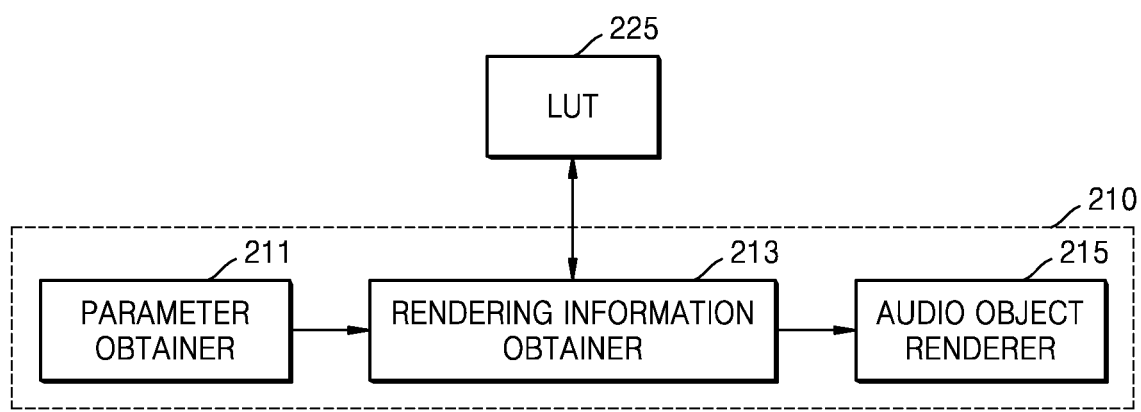
FIG. 3 is a diagram of a processor of FIG. 2 according to an embodiment.

FIG. 3 is a diagram of a processor of FIG. 2 according to an embodiment.

Referring to FIG. 3, the processor 210 may include a parameter obtainer 211, a rendering information obtainer 213, and an audio object renderer 215. The parameter obtainer 211, the rendering information obtainer 213, and the audio object renderer 215 may be implemented as a program stored in the memory 220.

In an embodiment of the disclosure, the parameter obtainer 211 may obtain a plurality of parameters related to spatialization of an audio object. The parameter obtainer 211 may obtain object content from an input video signal and an input audio signal. The parameter obtainer 211 may obtain feature information unique to the electronic apparatus 200 as an electronic apparatus parameter. The parameter obtainer 211 may obtain feature information related to the user's environment as a user parameter.

In an embodiment of the disclosure, the rendering information obtainer 213 may obtain rendering information by using the plurality of parameters obtained by the parameter obtainer 211. As described above, a lookup table 225 for rendering information retrieval may be prestored in the memory 220 of the electronic apparatus 200.

In an embodiment of the disclosure, the lookup table 225 prestored in the memory 220 may include the rendering information obtained by the manufacturer through training or experiment. In order to obtain rendering information, the manufacturer may perform an experiment with respect to each of various parameters. The manufacturer may output a video object and an audio object through an experimental electronic apparatus while changing parameters and may obtain rendering information that the assessors consider most suitable. The manufacturer may combine each of various parameters or at least two parameters through experiment and store rendering information, to which the assessors give the highest assessment score when a parameter value is adjusted, as a rendering value corresponding to the parameter value.

For example, in order to obtain rendering information according to the position or movement of the video object among the plurality of parameters, the manufacturer may output a picture in which the video object moves from a first subarea position to a second subarea position on the screen, through the experimental electronic apparatus. Simultaneously, the manufacturer may render and output the audio object with various rendering information in order to spatialize the audio object associated with the video object. The manufacturer may adjust a panning gain, a panning angle, a filter coefficient value, or the like and output the audio object processed according to the adjusted rendering information, together with the video object. A plurality of assessors may simultaneously hear the rendered audio object while seeing the video object displayed on the screen and may assess the spatialization degree of the audio object at that time. For example, a plurality of assessors may assess the accuracy of audio spatialization effect, the clarity of sound and overall experience, the transparency thereof, or the like by considering whether the audio object appears to be output at the recognized position of the video object on the screen. By repeating the same experiment while adjusting only the rendering information in the same environment, the manufacturer may obtain the rendering information that the assessors consider most suitable when a certain parameter has a certain value.

Also, the manufacturer may perform an experiment on the same parameter while changing the parameter value. In the above example, the manufacturer may adjust the parameter value, that is, the position or the degree of movement of the video object, and output the same on the screen. Simultaneously, the manufacturer may render and output the audio object with various rendering information. A plurality of assessors may simultaneously hear the rendered audio object while seeing the video object output according to the changed parameter value and may assess the spatialization degree of the audio object.

Similarly, the manufacturer may perform the same experiment on each of the plurality of parameters. For example, in the case where the video object is a human face and in the case where the video object is not a human face, or in the case where the video object is located in the foreground and in the case where the video object is located in the background, the manufacturer may obtain the degree of rendering information to which the assessors give the highest assessment score. In general, the user viewing the screen may tend to more concentratively view the screen when a human face appears on the screen. Also, the user may tend to be more interested in the video object located in the foreground than the video object located in the background.

Similarly, when the audio object is a voice and when the audio object is not a voice, the manufacturer may obtain, through experiment, the degree of rendering information to which the assessors give the highest assessment score. In general, when a human voice is output, the user viewing the screen may tend to more concentratively hearing the human voice than other sounds such as music or instrument sounds.

This viewer's tendency may affect the rendering information. For example, when the video object is a human face and the audio object corresponding to the video object is a human voice, when the manufacturer renders the audio object by increasing the panning angle above a certain size or decreasing the panning gain below a certain size with respect to the human voice, the assessors may feel that the voice is widely distributed and thus is not clearly heard. That is, when the video object is a human face and the audio object is a human voice, the assessors may assess that the human voice is best recognized when the panning angle is less than or equal to a certain range and the panning gain is greater than or equal to a certain size. The manufacturer may obtain rendering information with the highest assessment score through experiment and store the same corresponding to the parameter value.

In addition, the manufacturer may obtain rendering information by considering various parameters. By considering parameters such as the model of the electronic apparatus 200, the screen size of the electronic apparatus 200, the sound feature or speaker layout of the electronic apparatus 200, the position of the user viewing the electronic apparatus, and the number of users, the manufacturer may obtain rendering information with the best rendering effect in each case or in the case where two or more parameters are combined. For example, the manufacturer may store rendering information, to which a plurality of assessors give the highest assessment score while viewing the same content on the right, left, and center of the experimental electronic apparatus respectively, as a rendering value corresponding to the position of the user. For example, when the layout of the speaker is a 5.1 channel, the manufacturer may consider the position of the speaker in addition to the position of the assessor to obtain the value of rendering information when the assessment score is highest according to the distance or angle between the assessor and the speaker.

When each of various parameters or a plurality of parameters are combined, the manufacturer may obtain an optimal rendering score corresponding to the parameter value, generate the same as the lookup table 225, and store the same in the memory 220 of the electronic apparatus 200 or the like.

In an embodiment of the disclosure, by using the parameter obtained through the parameter obtainer 211, the rendering information obtainer 213 may retrieve rendering information corresponding to the obtained parameter from the lookup table 225. For example, when the parameter obtained by the parameter obtainer 211 is a user parameter and the user parameter indicates that the number of users is three and the users are located on the right, center, and left of the screen respectively, the rendering information obtainer 213 may retrieve rendering information corresponding to the number of users and the position of the users from the lookup table 225.

The rendering information may include at least one of an HRTF filter coefficient or a panning coefficient.

The HRTF filter may refer to a filter for localizing a virtual sound image. The HRTF filter may be a filter for correcting the position and tone or the like of a decoded sound signal. The HRTF filter may allow recognition of a stereoscopic sound due to a phenomenon in which not only simple path differences such as interaural level differences (ILD) and interaural time differences (ITD) but also complex path features such as diffraction at the head surface and reflection by the earflap change depending on the sound arrival direction. By changing the sound quality of a sound signal, the HRTF filter may process sound signals such that a stereophonic sound may be recognized.

The panning coefficient may be for adjusting the panning degree of a signal and may include at least one of a panning gain or a panning angle. The panning coefficient may be applied to each frequency band and each channel in order to pan an input sound signal to each output channel. The panning angle may be for adjusting the degree to which the signal is panned, that is, the degree to which the signal is spread. The panning gain may refer to controlling the magnitude of a signal applied to each output channel in order to render a sound source at a particular position between two output channels.

In an embodiment of the disclosure, the rendering information obtainer 213 may obtain rendering information corresponding to the parameter, that is, at least one of an HRTF filter coefficient or a panning coefficient, and transmit the obtained rendering information to the audio object renderer 215.

In an embodiment of the disclosure, the audio object renderer 215 may render the audio object by using the rendering information obtained by the rendering information obtainer 213. That is, the audio object renderer 215 may spatialize the audio object by processing the audio object by applying at least one of an HRTF filter coefficient or a panning coefficient to the audio object.

The audio object rendered by the audio object renderer 215 may be mixed with a multi-channel input sound signal and output to an output channel. For example, when the multi-channel input sound signal is a 7.1-channel signal and the output channel to be played is a 5.1-channel, the audio object renderer 215 may perform rendering by determining an output channel to correspond to each of the channels of the multi-channel input sound signal. The rendered audio signals may be mixed with signals of other channels and output as a final signal.

Figure 4:
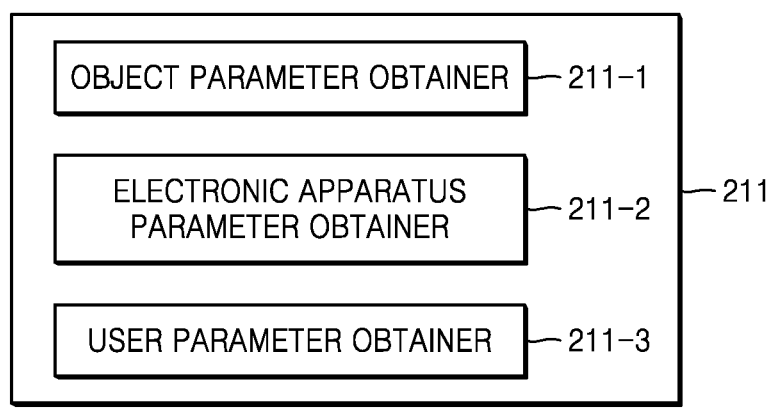
FIG. 4 is a diagram of a parameter obtainer of FIG. 3 according to an embodiment.

FIG. 4 is a diagram of a parameter obtainer of FIG. 3 according to an embodiment.

Referring to FIG. 4, the parameter obtainer 211 may include an object parameter obtainer 211-1, an electronic apparatus parameter obtainer 211-2, and a user parameter obtainer 211-3.

The object parameter obtainer 211-1 may obtain an object parameter from the input content. The object parameter may refer to a parameter representing the feature of an audio object related to audio spatialization and/or the feature of a video object associated with the audio object.

The object parameter may include an audio object type. The object parameter obtainer 211-1 may detect an audio object from the audio signal included in the content and may identify whether the audio object is a human voice or whether the audio object is a background sound.

The object parameter may include at least one of information about a video object type associated with the audio object or information about the position of the video object on the screen. The object parameter obtainer 211-1 may detect a video object from the video signal included in the content. The object parameter obtainer 211-1 may identify only a video object associated with the audio object, among video objects. This may be because a video object not associated with the audio object does not affect spatialization of an audio signal, for example, in the case of an object such as a tree or a mountain constituting the background.

The object parameter obtainer 211-1 may identify only a video object associated with the audio object and may identify whether the identified video object is a human face or whether the identified video object is a foreground or a background. Also, the object parameter obtainer 211-1 may identify the position of the video object on the screen.

In an embodiment of the disclosure, the electronic apparatus parameter obtainer 211-2 may obtain an electronic apparatus parameter. The electronic apparatus parameter may include at least one of unique information or setting information of the electronic apparatus 200. The electronic apparatus parameter may be stored in the memory 220.

The electronic apparatus unique information may include unique feature information according to the model of the electronic apparatus 200. For example, the unique information according to the model of the electronic apparatus 200 may include information about the sound feature of the electronic apparatus 200. The information about the sound feature may include whether an object tracking sound (OTS) function is supported, how much power a sound output has, whether there is a sound correction technology, whether there is a Dolby Atmos support function, and/or whether there is a home theater output support function.

Also, the unique information according to the model of the electronic apparatus 200 may include information about the screen size of the electronic apparatus 200.

Also, the unique information according to the model of the electronic apparatus 200 may include information about the speaker layout such as whether a speaker system is a 2-channel speaker or a 5.1-channel speaker.

The electronic apparatus setting information may include a score relationship according to the difference between a default setting value about the sound of the electronic apparatus 200 and a setting value selected by the user. For example, the electronic apparatus setting information may include a sound volume, a screen direction, and/or a score relationship according to the difference between a default setting value about the operation mode of the electronic apparatus 200 and a setting value selected by the user. The screen direction may indicate whether the direction of the screen is a horizontal mode or a horizontal mode.

The operation mode of the electronic apparatus 200 may be information indicating in which output mode the current content is being played. For example, the electronic apparatus 200 may output the content in a different mode depending on whether the genre of the content is general content or games. The electronic apparatus 200 may identify the genre of the content automatically or according to user setting and output the content in the mode suitable for the identified genre. For example, the electronic apparatus 200 may output the content in the mode specialized according to the genre of the content, such as a movie output mode, a game output mode, or a sports game output mode.

In addition, the electronic apparatus setting information may further include information about whether to apply the sound correction technology and/or information about whether to output the sound as a stereophonic sound.

In an embodiment of the disclosure, the user parameter obtainer 211-3 may obtain a user parameter of the user feature. The user parameter obtainer 211-3 may obtain a user parameter by using a sensor or the like included in or connected to the electronic apparatus 200.

For example, the electronic apparatus 200 may further include a sensor for sensing the position of the user or the like. The sensor may include an image sensor such as a camera, a UWB sensor, an infrared sensor, and/or a proximity sensor. The electronic apparatus 200 may use the sensor to detect how many users view the electronic apparatus 200, the current position of the user with respect to the electronic apparatus 200, the relationship between the positions of the speaker and the user, and/or the like.

Figure 5:
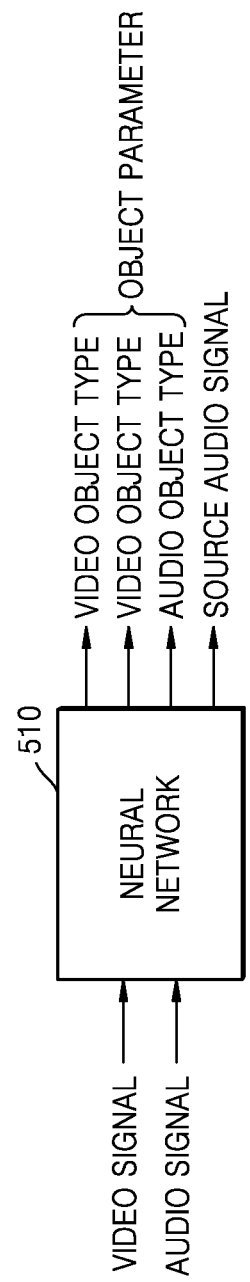
FIG. 5 is a diagram of obtaining an object parameter, according to an embodiment.

FIG. 5 is a diagram of obtaining an object parameter, according to an embodiment.

The electronic apparatus 200 may obtain an object parameter from the input content by using artificial intelligence (AI) technology. Referring to FIG. 5, the electronic apparatus 200 may use a neural network 510 to obtain an object parameter. In an embodiment of the disclosure, the electronic apparatus 200 may obtain an object parameter from a video signal and an audio signal included in the input content, based on a model by using at least one neural network.

The AI technology may include machine learning (deep learning) and element technologies using machine learning. The AI technology may be implemented by using an algorithm. Here, an algorithm or a set of algorithms for implementing the AI technology may be referred to as a neural network. The neural network may receive input data, perform an operation for analysis and classification, and output result data.

The neural network may include a plurality of internal layers for performing an operation. The neural network may obtain different feature maps from the respective layers.

In an embodiment of the disclosure, the electronic apparatus 200 may use at least one neural network 510 to obtain an object parameter. In an embodiment of the disclosure, the neural network 510 used by the electronic apparatus 200 may be a model pre-trained to obtain an object parameter and a source audio signal from an input video signal and an input audio signal. The neural network 510 may include an algorithm for extracting a feature from the input video signal and audio signal, or a set of algorithms, software for executing a set of algorithms, and/or hardware for executing a set of algorithms.

In an embodiment of the disclosure, the neural network 510 may detect a video object based on the features obtained from the input video signal. Also, in an embodiment of the disclosure, the neural network 510 may detect an audio object based on the features obtained from the input audio signal.

In an embodiment of the disclosure, the neural network 510 may obtain a feature vector about the relationship between the input video signal and the input audio signal. The neural network 510 may detect only a video object related to the audio object by using a feature vector about the relationship between a video signal and an audio signal and may obtain feature information about the detected video object.

In an embodiment of the disclosure, the neural network 510 may classify the detected video object by type. For example, the neural network 510 may identify whether the video object is a human face or whether the video object is a foreground or a background. Also, the neural network 510 may identify the position of the detected video object. The neural network 510 may output the type of the video object and the position of the video object as the object parameter.

In an embodiment of the disclosure, when the sound input to the electronic apparatus 200 is mono-channel or 2-channel, the neural network 510 may perform source separation on the audio signal. For example, when the input sound is 2-channel, the 2-channel sound signal may be in a state where signals of a plurality of sources are mixed. In an embodiment of the disclosure, when the input audio signal is a mono or 2-channel sound signal, the neural network 510 may separate the audio signal for each source.

In an embodiment of the disclosure, the neural network 510 may identify a source audio signal, which is to be rendered among the separated audio signals for each source, as an audio object and output the same. According to an embodiment of the disclosure, there may be a plurality of source audio signals to be rendered.

The source audio signal output from the neural network 510 may be rendered by the audio object renderer 215.

The neural network 510 may obtain an object parameter of the audio feature from the separated audio signal for each source. For example, from the source audio signal, the neural network 510 may obtain at least one of information indicating whether the audio object is a voice or information indicating whether the audio object is a background sound. The neural network 510 may output the type of the audio object as the object parameter.

Figure 6:
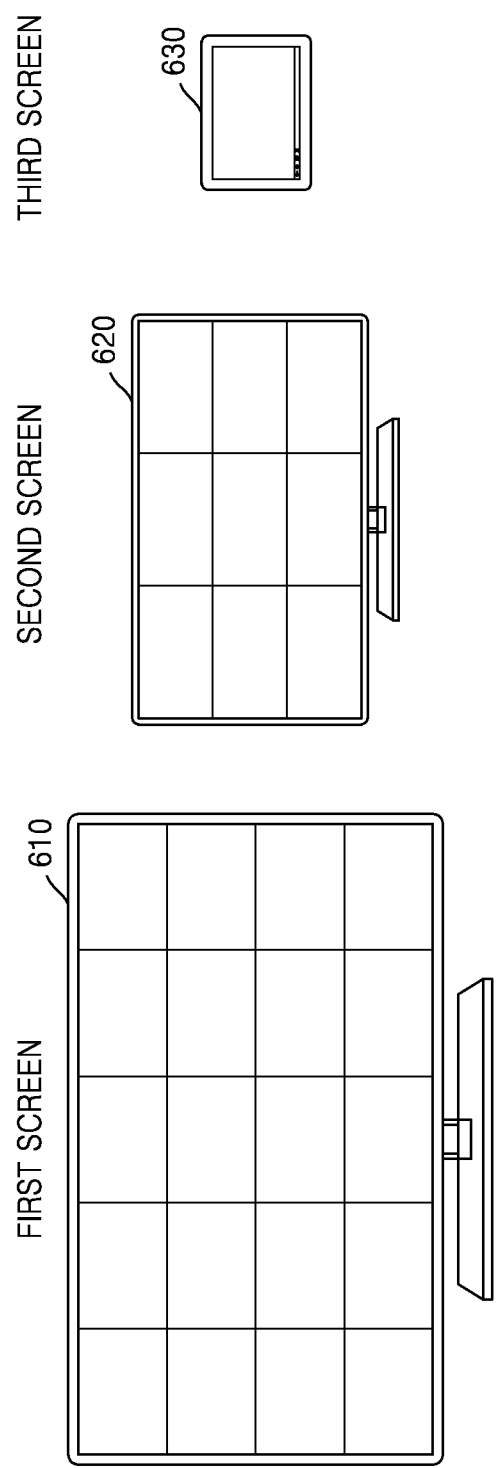
FIG. 6 is a diagram of an electronic apparatus parameter according to an embodiment.

FIG. 6 is a diagram of an electronic apparatus parameter according to an embodiment.

In an embodiment of the disclosure, the manufacturer may store an electronic apparatus parameter in the electronic apparatus 200. The electronic apparatus parameter may refer to information about the feature of the electronic apparatus 200 related to spatialization of an audio object. The electronic apparatus parameter may include unique information of the electronic apparatus 200. The unique information of the electronic apparatus 200 may include information about the screen size of the electronic apparatus 200.

Referring to FIG. 6, the electronic apparatus 200 may have various screen sizes.

In FIG. 6, three screens are illustrated, and the screen sizes may decrease in the order of a first screen 610, a second screen 620, and a third screen 630.

In general, when the screen size is large, the user may view the screen at a position further away from the screen. When the electronic apparatus 200 outputs the video object through the large screen and renders the audio object by using the same panning gain as in the case of the small screen size, the stereoscopic effect and immersion effect of the audio object output corresponding to the video object may further degrade. Thus, according to an embodiment of the disclosure, even in the case of outputting the same video signal and audio signal, the electronic apparatus 200 may output the audio object by setting the rendering information differently according to the screen size.

In general, the human may tend to view the center portion of the screen more than the edge portion thereof. Thus, even when the same video object is output, the degree of attracting the human's attention may vary between the case where the video object is located at the center of the screen and the case where the video object is located at the edge portion of the screen.

Also, when the size of the screen is larger than a certain size, the human may mainly view the center portion thereof, but when the size of the screen is not large, the human may tend to view the entire area at once. That is, when the human views a video, the concentrated viewing position may vary depending on the size of the screen. This may mean that the spatialization degree of the audio object should also be set differently according to the position of the video object when the screen size is large. Conversely, when the screen size is small, it may mean that the position of the video object does not need to be greatly considered in rendering the audio object.

In an embodiment of the disclosure, the electronic apparatus 200 may obtain information about the screen size as the electronic apparatus parameter and render the audio object by using the rendering information suitable for the screen size.

Figure 7:
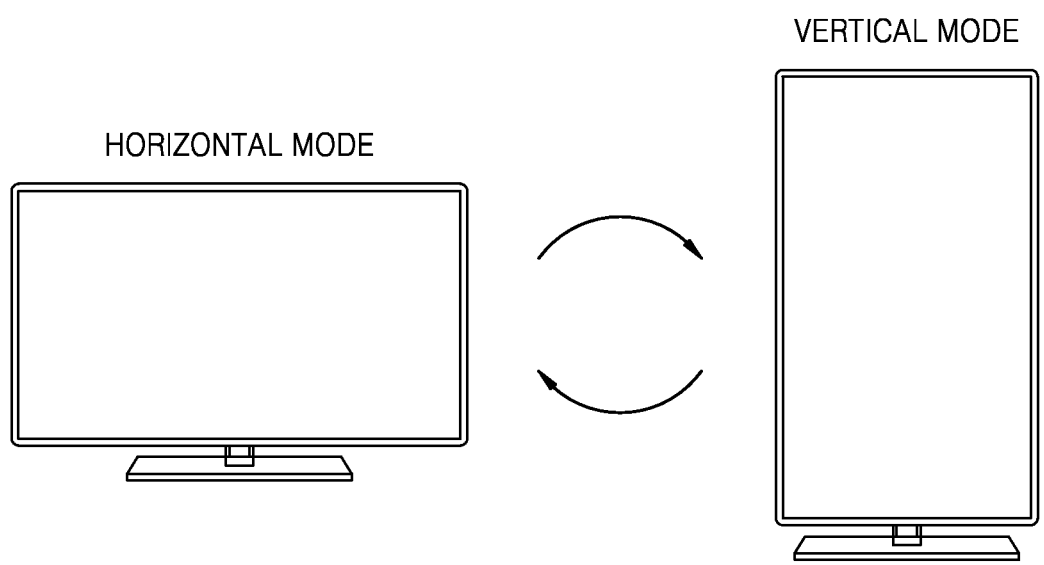
FIG. 7 is a diagram of an electronic apparatus parameter according to another embodiment of the disclosure.

FIG. 7 is a diagram of an electronic apparatus parameter according to another embodiment of the disclosure.

The electronic apparatus parameter may include electronic apparatus setting information. The electronic apparatus setting information may include information about how the electronic apparatus 200 is currently set to operate. The electronic apparatus setting information may include information about the screen direction of the electronic apparatus 200.

Referring to FIG. 7, the electronic apparatus 200 may operate in a horizontal mode or a vertical mode depending on the screen direction. In an embodiment of the disclosure, the horizontal mode may refer to a case where the horizontal-axis length of the screen is greater than the vertical-axis length thereof. In an embodiment of the disclosure, the vertical mode may refer to a case where the vertical-axis length of the screen is greater than the horizontal-axis length thereof. The electronic apparatus 200 may be pivoted to the vertical mode or to the horizontal mode. The electronic apparatus 200 may be pivoted from the horizontal mode to the vertical mode or from the vertical mode to the horizontal mode by using a pivot unit. For example, the electronic apparatus 200 may be pivoted by using a hinge included in a stand-type or wall-mounted-type support member supporting the electronic apparatus 200. Alternatively, the electronic apparatus 200 may further include a motor or the like for rotation and may be pivoted based on the motor.

When the electronic apparatus 200 operates in the horizontal mode and when the electronic apparatus 200 operates in the vertical mode, even when the same audio object is output, the sense of space of the audio object sensed by the user may vary. This may be because when the electronic apparatus 200 operates in the horizontal mode, because the horizontal width is large, the panning angle increases in the horizontal direction, whereas when the electronic apparatus 200 operates in the vertical mode, because the horizontal width becomes narrow and the panning angle increases in the vertical direction, it is important to output the sound with a sense of altitude.

The electronic apparatus 200 may render the audio object by using different HRTF filter coefficients, panning gains, panning angles, or the like in the case where the screen direction is the horizontal mode and in the case where the screen direction is the vertical mode. For example, when operating in the vertical mode, the electronic apparatus 200 may render the audio object by using an HRTF altitude filter coefficient such that localization of a sound image in the horizontal direction may be more importantly considered than a sense of altitude in the vertical direction.

By rendering the audio object by considering the screen direction, the electronic apparatus 200 may allow the user to experience the audio object more stereoscopically and naturally.

Figure 8:
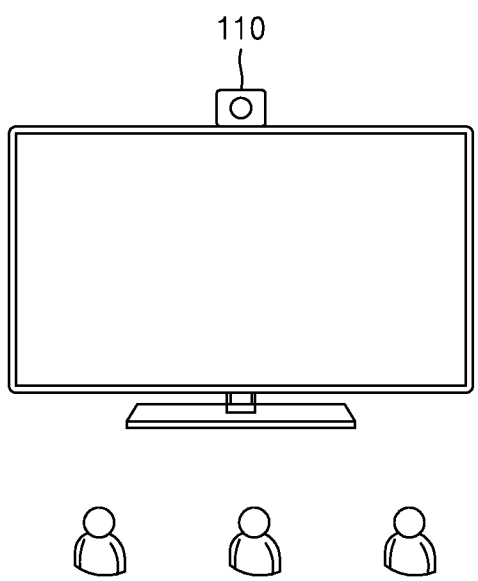
FIG. 8 is a diagram of a user parameter according to an embodiment.

FIG. 8 is a diagram of a user parameter according to an embodiment. The user parameter may include information about at least one of the number of users around the electronic apparatus 200 or the position of the user.

In an embodiment of the disclosure, the electronic apparatus 200 may obtain information about the position of the user. The electronic apparatus 200 may include a sensor 110 for sensing the position of the user.

The sensor 110 may include a camera. The sensor 110 may detect the position of the user by obtaining an image of the user through a camera in real time. Alternatively, the sensor 110 may obtain a biometric signal of the user through a plurality of antennas by using an ultra-wideband (UWB) module or the like and detect the position of the user therefrom. Alternatively, the sensor 110 may detect the iris movement of the user or the like in various ways and detect the viewing angle of the user therethrough.

In an embodiment of the disclosure, the user parameter may include the number of users and viewing position information of the user.

When the viewing position of the user varies, the viewing angle of the user and/or the distance between the user and the electronic apparatus 200 may vary. In this case, the area importantly viewed by the user on the screen may vary, and accordingly, the spatialization of the audio object corresponding to the video object may also vary. The viewing angle may include, for example, at least one of an azimuth or an elevation angle between the user and the electronic apparatus 200 with respect to a virtual line connecting the centers of the user and the electronic apparatus 200.

Also, the distance or angle between the speaker and the user may vary according to the viewing position of the user. For example, when the speaker installed in the electronic apparatus 200 is arranged on the left and right sides of the electronic apparatus 200, the distance between the user and the speaker may vary according to the position of the user and thus the degree of recognition of an audio signal output from the speaker may also vary.

Also, when the number of users is great, the electronic apparatus 200 may be required to allow all users (not just one user) to recognize the audio signal stereoscopically.

In preparation for this scenario, when a plurality of assessors simultaneously view the same content at various positions, the manufacturer may prestore the rendering information in the case where the average score of the plurality of assessors is highest, as a rendering value corresponding to the number or position of users.

For example, the manufacturer may obtain an assessment score by adjusting the rendering information for each case when the assessor is located on the left side of the screen or when the assessor is located on the right side of the screen or when the assessor is located uniformly from the left side to the right side of the screen and, based on this, may store the rendering information in the case where the assessment score is high, as a rendering value corresponding to the number of users and the position of the user.

The manufacturer may generate rendering information corresponding to the position and number of users in the form of a lookup table and may store the same in the memory 220 of the electronic apparatus 200.

Figure 9:
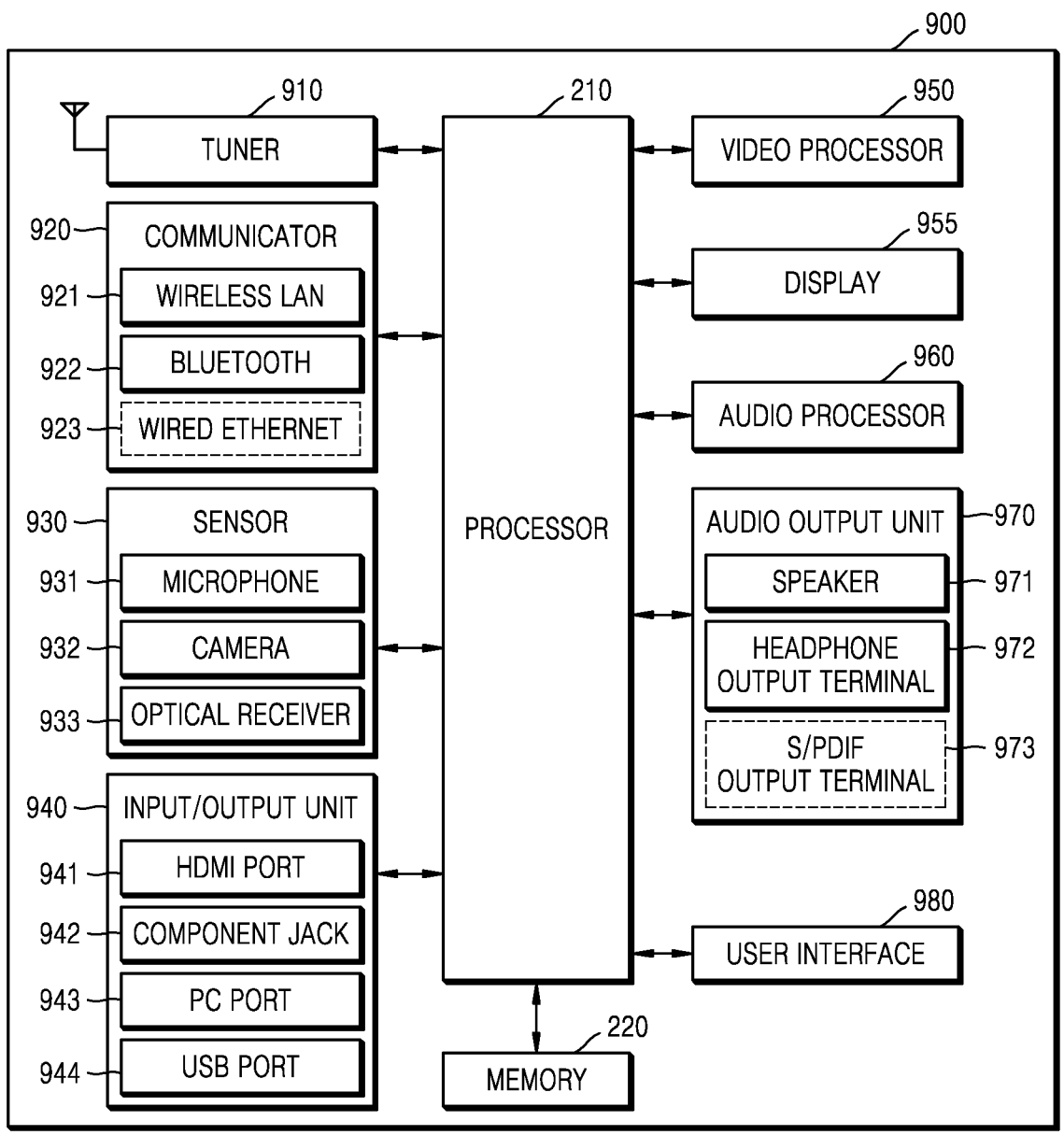
FIG. 9 is a diagram of an electronic apparatus according to an embodiment.

FIG. 9 is a diagram of an electronic apparatus according to an embodiment.

The electronic apparatus 900 of FIG. 9 may include the elements of the electronic apparatus 200 of FIG. 2.

Referring to FIG. 9, in addition to the processor 210 and the memory 220, the electronic apparatus 900 may include a tuner 910, a communicator 920, a sensor 930, an input/output unit 940, a video processor 950, a display 955, an audio processor 960, an audio output unit 970, and a user interface 980.

The tuner 910 may process broadcast content, which is received by wire or wireless, through amplification, mixing, and/or resonance, and may tune and select only the frequency of a channel, which is to be received by the electronic apparatus 900, among a plurality of wave components. The content received through the tuner 910 may be decoded and divided into audio, video, and/or additional information. The audio, video, and/or additional information may be stored in the memory 220 under the control by the processor 210.

The communicator 920 may connect the electronic apparatus 900 to an external device or a server under the control by the processor 210. The electronic apparatus 900 may download a program or an application required by the electronic apparatus 900 from an external device or a server or perform web browsing through the communicator 920. Also, the communicator 920 may receive content from an external device.

The communicator 920 may include at least one of wireless LAN 921, Bluetooth 922, or wired Ethernet 923 corresponding to the structure and performance of the electronic apparatus 900. The communicator 920 may receive a control signal through a controller such as a remote control under the control by the processor 210. The control signal may be implemented as a Bluetooth type, an RF signal type, or a WiFi type. The communicator 920 may further include other short-range communications (e.g., Near Field Communication (NFC) and Bluetooth Low Energy (BLE)) in addition to Bluetooth 922. According to an embodiment of the disclosure, the communicator 920 may transmit/receive a connection signal to/and from an external device through short-range communication such as Bluetooth 922 or BLE.

In an embodiment of the disclosure, the communicator 920 may detect the position of the user by using various communication modules. Also, although not illustrated in FIG. 9, the communicator 920 may include a UWB module. The UWB module may obtain a biometric signal of the user by using a plurality of antennas and may determine the position of the user or the like therethrough.

The sensor 930 may sense the user's voice, the user's image, or the user's interaction and may include a microphone 931, a camera 932, and a light receiver 933. The microphone 931 may receive an utterance voice of the user, convert the received voice into an electrical signal, and output the same to the processor 210.

The camera 932 may include a sensor and a lens and may obtain an image formed on the screen. In an embodiment of the disclosure, the camera 932 may obtain information about the position of the user, the viewing angle of the user, or the like from the user image.

The light receiver 933 may receive a light signal (including a control signal). The light receiver 933 may receive a light signal corresponding to a user input (e.g., touch, press, touch gesture, voice, or motion) from a controller such as a remote control or a mobile phone. The control signal may be extracted from the received light signal under the control by the processor 210.

The input/output unit 940 may receive video (e.g., moving image signal or still image signal), audio (e.g., voice signal or music signal), and additional information such as metadata from a device outside the electronic apparatus 900 under the control by the processor 210. The input/output unit 940 may include one of a High-Definition Multimedia Interface (HDMI) port 941, a component jack 942, a PC port 943, and a universal serial bus (USB) port 944. The input/output unit 940 may include any combination of the HDMI port 941, the component jack 942, the PC port 943, and the USB port 944.

The video processor 950 may process image data to be displayed by the display 955 and perform various image processing operations such as decoding, rendering, scaling, noise removal, frame rate conversion, and resolution conversion on the image data.

The display 955 may display the content received from a broadcasting station or received from an external server or an external storage medium. The content may include media signals such as video signals, images, or text signals. Also, the display 955 may display the video signal or image received through the HDMI port 941.

When the display 955 is implemented as a touch screen, the display 955 may be used as an input device in addition to an output device. Also, depending on the type of the electronic apparatus 900, the electronic apparatus 900 may include two or more displays 955.

The audio processor 960 may perform processing on audio data. The audio processor 960 may perform various processings such as decoding, amplification, and noise removal on the audio data. In an embodiment of the disclosure, the audio processor 960 may obtain an audio object to be spatialized, that is, a source audio signal, and render the audio object by using the rendering information obtained by considering various parameters.

The audio output unit 970 may output the audio signal processed by the audio processor 960. Under control by the processor 210, the audio output unit 970 may output the audio included in the content received through the tuner 910, the audio input through the communicator 920 or the input/output unit 940, or the audio stored in the memory 220. The audio output unit 970 may include at least one of a speaker 971, a headphone output port 972, or a Sony/Philips Digital Interface (S/PDIF) output port 973.

The user interface 980 may receive a user input for controlling the electronic apparatus 900.

In an embodiment of the disclosure, through the user interface 980, the user may select the priority between parameters or change the priority between parameters. Also, through the user interface 980, the user may adjust the volume, adjust the screen direction, or change the operation mode of the electronic apparatus.

The user interface 980 may include, but is not limited to, various types of user input devices such as a touch panel for detecting a user's touch, a button for receiving a user's push operation, a wheel for receiving a user's rotation operation, a keyboard, a dome switch, a microphone for voice recognition, and a motion detection sensor for sensing a motion. Also, when the electronic apparatus 900 is operated by a remote controller, the user interface 980 may receive a control signal received from the remote controller.

Figure 10:
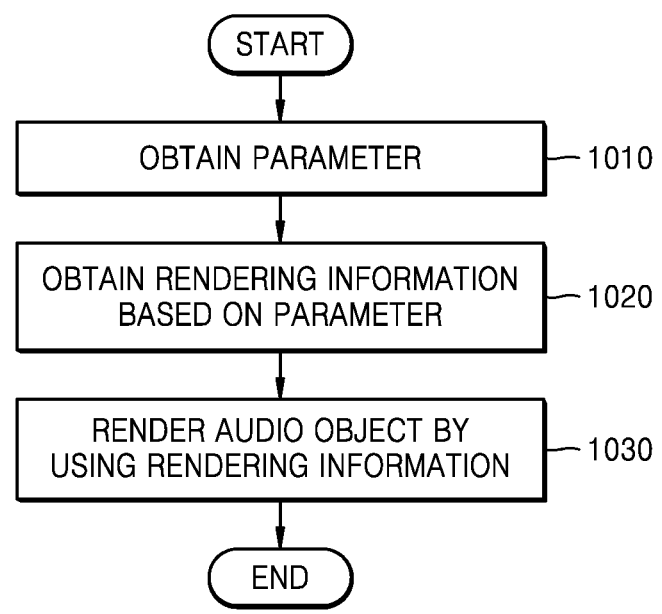
FIG. 10 is a flowchart illustrating an operating method of an electronic apparatus according to an embodiment.

FIG. 10 is a flowchart illustrating an operating method of an electronic apparatus according to an embodiment.

Referring to FIG. 10, in operation 1010, the electronic apparatus may obtain a parameter. The electronic apparatus may obtain a parameter related to spatialization of an audio object. The electronic apparatus may obtain at least one of an object parameter, an electronic apparatus parameter, or a user parameter.

In operation 1020, the electronic apparatus may obtain rendering information based on the parameter. The electronic apparatus may obtain rendering information corresponding to the obtained parameter from a prestored lookup table. The rendering information may include at least one of an HRTF coefficient or a panning coefficient. Also, the panning coefficient may include at least one of a panning gain or a panning angle.

In operation 1030, the electronic apparatus may render the audio object by using the rendering information. By rendering the audio object and adjusting the position, size, range, or the like of the audio object, the electronic apparatus may allow the audio object to be stereoscopically heard at a certain position.

Figure 11:
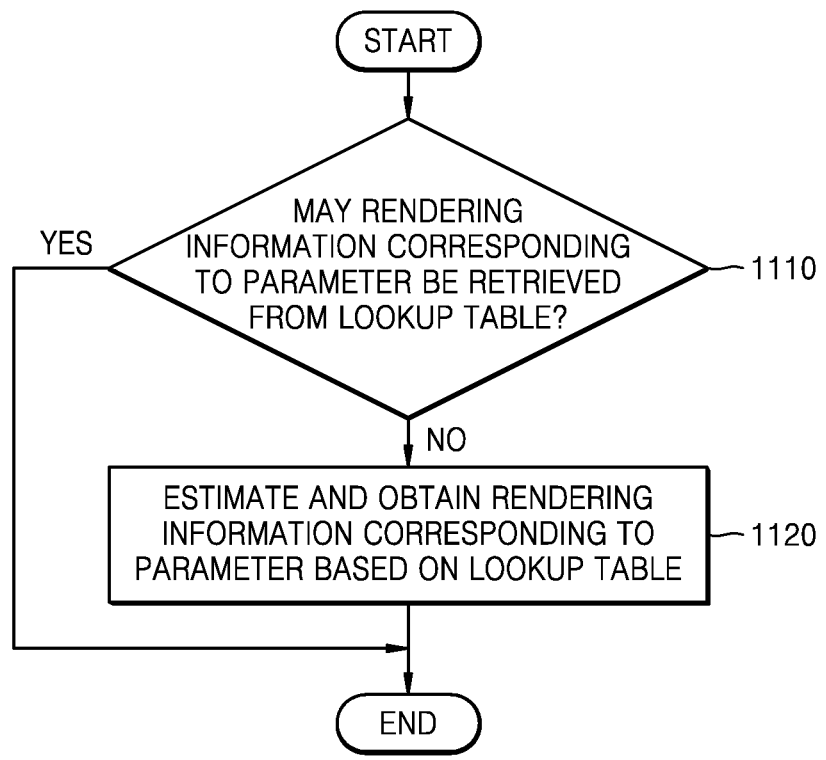
FIG. 11 is a flowchart illustrating a process of obtaining rendering information, according to an embodiment.

FIG. 11 is a flowchart illustrating a process of obtaining rendering information, according to an embodiment.

Referring to FIG. 11, in operation 1110, the electronic apparatus may determine whether rendering information corresponding to the parameter may be retrieved from the lookup table.

When rendering information corresponding to a desired parameter value may not be obtained from a prestored lookup table corresponding to the parameter, in operation 1120, the electronic apparatus may estimate and obtain rendering information corresponding to the parameter based on the lookup table.

When the rendering information corresponding to the parameter is not included in the lookup table, the electronic apparatus may estimate and obtain rendering information corresponding to a desired parameter based on the data of the lookup table by using at least one of a statistical model, a machine learning model, or a regression model.

FIG. 12 is a flowchart illustrating a process of sequentially considering parameters in the order of the parameter having a higher priority, according to an embodiment.

Referring to FIG. 12, the electronic apparatus may consider parameters in the order of the parameter having a higher priority.

In operation 1210, the electronic apparatus may determine whether the parameter value of the first priority is greater than or equal to a reference value). Each parameter may have a reference value set suitable thereto. The reference value suitable to the parameter may be set as a default value, set by the user, or modified by the user.

In operation 1220, when the parameter value of the first priority is greater than or equal to the reference value, the electronic apparatus may determine whether the parameter value of the second priority is greater than or equal to the reference value.

In operation 1250, when the parameter value of the first priority is not greater than or equal to the reference value, the electronic apparatus may deactivate an operation of obtaining rendering information and an operation of rendering an audio object based on the rendering information.

In operation 1240, when the parameter value of the second or higher priority is not greater than or equal to the reference value (i.e., less than the reference value), the electronic apparatus may obtain rendering information from the lookup table based on a combination of parameters greater than or equal to the reference value.

In operation 1230, when the parameter value of the second priority is greater than or equal to the reference value, the electronic apparatus may determine whether the parameter value of the third priority is greater than or equal to the reference value.

In operation 1240, the electronic apparatus may obtain rendering information from the lookup table based on a combination of parameters greater than or equal to the reference value.

The electronic apparatus and the operating method thereof according to some embodiments of the disclosure may also be implemented in the form of a computer-readable recording medium including instructions executable by a computer, such as program modules executed by a computer. The computer-readable recording mediums may be any available mediums accessible by computers and may include both volatile and non-volatile mediums and detachable and non-detachable mediums. Also, the computer-readable recording mediums may include both computer storage mediums and communication mediums. The computer storage mediums may include both volatile and non-volatile and detachable and non-detachable mediums implemented by any method or technology for storage of information such as computer-readable instructions, data structures, program modules, or other data. For example, the communication mediums may include any information transmission mediums and may include other transmission mechanisms or other data of modulated data signals such as computer-readable instructions, data structures, program modules, or carriers.

Some of the technologies used in embodiments of the disclosure may be known as names such as Screen-Content-User Tracking Sound (SCUTS), Screen Adaptive Audio Rendering (SAAR), Video Adaptive Audio Rendering (VAAR), Content Adaptive Audio Rendering (CAAR), User Adaptive Audio Rendering (UAAR), Object Tracking Sound Pro++ (OTS Pro++), OTS Pro+, OTS+, and OTS.

Also, herein, the "unit" may include a hardware component such as a processor or a circuit and/or a software component executed by a hardware component such as a processor.

Also, the electronic apparatus and the operating method thereof according to the embodiments of the disclosure described above may be implemented as a computer program product including a computer-readable recording medium having recorded thereon a program for implementing the operating method thereof including obtaining a parameter related to spatialization of an audio object, obtaining rendering information based on the parameter, and rendering the audio object by using the rendering information, wherein the parameter includes at least one of an object parameter of a feature of at least one of the audio object or a video object associated with the audio object, an electronic apparatus parameter of a feature of the electronic apparatus, or a user parameter of a feature of a user.

The foregoing descriptions are merely examples, and those of ordinary skill in the art will readily understand that various modifications may be made therein without materially departing from the spirit or features of the disclosure.

Therefore, it is to be understood that the embodiments described above should be considered in a descriptive sense only and not for purposes of limitation. For example, each element described as a single type may also be implemented in a distributed manner, and similarly, elements described as being distributed may also be implemented in a combined form.

What is claimed is:

1. A method of an electronic apparatus for audio signal processing, the method comprising:
   obtaining a parameter related to spatialization of an audio object;
   obtaining rendering information based on the parameter related to spatialization; and
   rendering the audio object based on the rendering information,
   wherein the parameter related to spatialization comprises an object parameter of a feature of a video object associated with the audio object,
   wherein the parameter related to spatialization further comprises a plurality of parameters, each parameter of the plurality of parameters having a priority, and
   wherein the obtaining of the rendering information comprises obtaining rendering information corresponding to a parameter of the plurality of parameters in an order of a parameter having a higher priority.

2. The method of claim 1, wherein the obtaining of the rendering information comprises:
   obtaining a lookup table; and
   retrieving the rendering information from the obtained lookup table.

3. The method of claim 2, further comprising, based on the rendering information not being included in the lookup table, estimating the rendering information based on the lookup table using at least one of a statistical model, a machine learning model, or a regression model.

4. The method of claim 2,
   wherein the obtaining of the rendering information further comprises:
      based on a parameter value with Nth priority, wherein N comprises a natural number, being greater than or equal to a reference value, sequentially considering a parameter value with (N+1) th priority as a next priority, and
      obtaining the rendering information from the lookup table based on a first combination of parameters greater than or equal to the reference value.

5. The method of claim 4, wherein the obtaining of the rendering information further comprises obtaining the rendering information from the lookup table based on a second combination of parameters with up to (N−1) th priority as a previous priority based on the parameter value with the Nth priority being less than the reference value, and
   wherein the method further comprising deactivating the obtaining of the rendering information and the rendering of the audio object based on N being 1.

6. The method of claim 2, wherein the obtaining of the lookup table comprises:
   changing at least one parameter value and audio rendering information related to the spatialization of the audio object in response to an output of a video signal and an audio signal from the electronic apparatus,
   obtaining a first assessment score from a plurality of assessors;
   obtaining second assessment score from the plurality of assessors with respect to a combination of a plurality of parameters, obtaining a first parameter value and rendering information corresponding to the first parameter value based on a highest average assessor score being obtained; and generating and storing the lookup table including the first parameter value and the rendering information corresponding to the first parameter value.

7. The method of claim 1, wherein the parameter related to spatialization further comprises an object parameter of an audio object type of the audio object, and wherein the audio object type comprises at least one of information indicating whether the audio object is a voice or information indicating whether the audio object is a background sound.

8. The method of claim 7, wherein the object parameter of the feature of the video object associated with the audio object comprises a video object type, and wherein the video object type comprises at least one of information indicating whether the video object is a human face or information indicating whether the video object is a foreground or a background.

9. The method of claim 1, wherein the parameter related to spatialization further comprises an electronic apparatus parameter of a feature of the electronic apparatus, wherein the electronic apparatus parameter comprises at least one of unique information or setting information of the electronic apparatus, wherein the unique information comprises at least one of a sound feature, a screen size, or speaker layout information depending on a model of the electronic apparatus, and wherein the setting information comprises at least one of an audio volume of the electronic apparatus, a direction of a screen, or an operation mode of the electronic apparatus.

10. The method of claim 1, wherein the parameter related to spatialization further comprises a user parameter of a feature of a user, and wherein the user parameter comprises information indicating at least one of a number of users or a position of the user.

11. An electronic apparatus for audio signal processing, the electronic apparatus comprising:

a memory storing instructions; and a processor configured to execute the instructions to:

obtain a parameter related to spatialization of an audio object, obtain rendering information based on the parameter related to spatialization, and render the audio object based on the rendering information, wherein the parameter related to spatialization comprises an object parameter of a feature of a video object associated with the audio object, wherein the parameter related to spatialization further comprises a plurality of parameters, each parameter of the plurality of parameters having a priority, and wherein the processor is further configured to execute the instructions to obtain the rendering information by obtaining rendering information corresponding to a parameter of the plurality of parameters in an order of a parameter having a higher priority.

12. The electronic apparatus of claim 11, wherein the processor is further configured to execute the instructions to:

obtain a lookup table; and retrieve the rendering information from the obtained lookup table.

13. The electronic apparatus of claim 12, wherein the processor is further configured to execute the instructions to, based on the rendering information not being included in the lookup table:

estimate the rendering information based on the lookup table using at least one of a statistical model, a machine learning model, or a regression model.

14. The electronic apparatus of claim 12, wherein the processor is further configured to execute the instructions to, based a parameter value with Nth priority, wherein N comprises a natural number, being greater than or equal to a reference value, sequentially consider a parameter value with (N+1) th priority as a next priority, and obtain the rendering information from the lookup table based on a first combination of parameters greater than or equal to the reference value.

15. The electronic apparatus of claim 14, wherein the processor is further configured to execute the instructions to obtain the rendering information from the lookup table based on a second combination of parameters with up to (N−1) th priority as a previous priority based on the parameter value with the Nth priority being less than the reference value, and deactivate the obtaining of the rendering information and the rendering of the audio object based on N being 1.

16. The electronic apparatus of claim 12, wherein the lookup table comprises a value for each of types of parameters and rendering information corresponding to the value for each of the types, and wherein the processor is further configured to execute the instructions to obtain the lookup table by:

changing at least one parameter value and audio rendering information related to spatialization of an audio object in response to a video signal and an audio signal output from the electronic apparatus, obtaining a first assessment score from a plurality of assessors, obtaining second assessment score from the plurality of assessors with respect to a combination of a plurality of parameters, obtaining a first parameter value and rendering information corresponding to the first parameter value based on a highest average assessor score being obtained, and generating and storing the lookup table including the first parameter value and the rendering information corresponding to the first parameter value.

17. The electronic apparatus of claim 11, wherein the parameter related to spatialization further comprises an object parameter of an audio object type of the audio object, and wherein the audio object type comprises at least one of information indicating whether the audio object is a voice or information indicating whether the audio object is a background sound.

18. The electronic apparatus of claim 17, wherein the object parameter of the feature of the video object associated with the audio object comprises a video object type, and wherein the video object type comprises at least one of information indicating whether the video object is a human face or information indicating whether the video object is a foreground or a background.

19. The electronic apparatus of claim 11, wherein the parameter related to spatialization further comprises an electronic apparatus parameter of a feature of the electronic apparatus, wherein the electronic apparatus parameter comprises at least one of unique information or setting information of the electronic apparatus, wherein the unique information comprises at least one of a sound feature, a screen size, or speaker layout information depending on a model of the electronic apparatus, and wherein the setting information comprises at least one of an audio volume of the electronic apparatus, a direction of a screen, or an operation mode of the electronic apparatus.

20. A non-transitory computer-readable recording medium storing instructions that, when executed by at least one processor, cause the at least one processor to:

obtain a parameter related to spatialization of an audio object;

obtain rendering information based on the parameter related to spatialization; and render the audio object based on the rendering information, wherein the parameter related to spatialization comprises an object parameter of a feature of a video object associated with the audio object, wherein the parameter related to spatialization further comprises a plurality of parameters, each parameter of the plurality of parameters having a priority, and wherein the instructions, when executed by the at least one processor, cause the at least one processor to obtain the rendering information by obtaining rendering information corresponding to a parameter of the plurality of parameters in an order of a parameter having a higher priority.

* * * * *